(12) United States Patent  (10) Patent No.: US 7,577,726 B1
Conard et al.  (45) Date of Patent: Aug. 18, 2009

(54) METHOD FOR UPDATING A HARDWARE CONFIGURATION OF A NETWORKED COMMUNICATIONS DEVICE

(75) Inventors: Theodore Conard, Milpitas, CA (US); Ming Chi Chen, Union City, CA (US)

(73) Assignee: Cisco Technology, Inc., San Jose, CA (US)

(*) Notice: Subject to any disclaimer, the term of this patent is extended or adjusted under 35 U.S.C. 154(b) by 550 days.

(21) Appl. No.: 10/071,811

(22) Filed: Feb. 7, 2002

(51) Int. Cl.
*G06F 15/177* (2006.01)

(52) U.S. Cl. ...................................... 709/221; 709/238

(58) Field of Classification Search ......... 709/220–222, 709/238–242; 717/168–178, 111; 370/229, 370/401
See application file for complete search history.

(56) References Cited

U.S. PATENT DOCUMENTS

| | | | | | |
|---|---|---|---|---|---|
| 4,268,908 | A | * | 5/1981 | Logue et al. ................... | 712/38 |
| 5,521,833 | A | * | 5/1996 | Lesch ........................... | 716/17 |
| 5,535,368 | A | * | 7/1996 | Ho et al. ....................... | 711/170 |
| 5,537,295 | A | * | 7/1996 | Van Den Bout et al. ...... | 361/767 |
| 5,615,225 | A | * | 3/1997 | Foster et al. .............. | 379/29.01 |
| 5,655,148 | A | * | 8/1997 | Richman et al. ................ | 710/8 |
| 5,671,355 | A | * | 9/1997 | Collins ....................... | 709/250 |
| 5,748,912 | A | * | 5/1998 | Lee ............................. | 710/301 |
| 5,819,042 | A | * | 10/1998 | Hansen ........................ | 709/222 |
| 5,918,194 | A | * | 6/1999 | Banaska et al. ................ | 702/91 |
| 6,009,274 | A | * | 12/1999 | Fletcher et al. .............. | 717/174 |
| 6,085,317 | A | * | 7/2000 | Smith ............................ | 713/1 |
| 6,094,679 | A | * | 7/2000 | Teng et al. ................... | 709/220 |
| 6,096,091 | A | * | 8/2000 | Hartmann .................... | 716/17 |
| 6,219,785 | B1 | * | 4/2001 | Smith ............................ | 713/1 |
| 6,457,125 | B1 | * | 9/2002 | Matthews et al. ........... | 713/160 |
| 6,505,338 | B1 | * | 1/2003 | Suzuki et al. ................. | 716/18 |
| 6,539,510 | B1 | * | 3/2003 | St. Pierre et al. ............ | 714/727 |
| 6,687,710 | B1 | * | 2/2004 | Dey ........................ | 707/104.1 |
| 6,854,009 | B1 | * | 2/2005 | Hughes ...................... | 709/220 |
| 6,901,580 | B2 | * | 5/2005 | Iwanojko et al. ............ | 717/121 |
| 6,931,440 | B1 | * | 8/2005 | Blumenau et al. ........... | 709/220 |
| 6,961,762 | B1 | * | 11/2005 | Yeap et al. ................... | 709/221 |
| 6,965,928 | B1 | * | 11/2005 | Cox et al. .................... | 709/220 |
| 6,965,929 | B2 | * | 11/2005 | Kumar ........................ | 709/220 |
| 6,978,301 | B2 | * | 12/2005 | Tindal ......................... | 709/223 |
| 7,024,449 | B1 | * | 4/2006 | Ellis, III ...................... | 709/201 |
| 7,035,906 | B1 | * | 4/2006 | Ellis, III ..................... | 709/208 |
| 7,039,724 | B1 | * | 5/2006 | Lavian et al. ............... | 709/250 |
| 7,051,087 | B1 | * | 5/2006 | Bahl et al. ................... | 709/220 |
| 7,051,185 | B2 | * | 5/2006 | Gilson ......................... | 712/11 |
| 7,100,124 | B2 | * | 8/2006 | Cooke et al. .................... | 716/1 |
| 7,180,887 | B1 | * | 2/2007 | Schwaderer et al. ........ | 370/351 |
| 2002/0129181 | A1 | * | 9/2002 | Lahiri et al. ................ | 710/113 |
| 2002/0144045 | A1 | * | 10/2002 | Edara et al. ................. | 710/305 |

* cited by examiner

*Primary Examiner*—Andrew Caldwell
*Assistant Examiner*—Michael D Meucci
(74) *Attorney, Agent, or Firm*—Stolowitz Ford Cowger LLP

(57) ABSTRACT

In a method for updating a hardware configuration of a networked communications device, a networked communications device is provided with one or more programmable logic units. A first hardware configuration is determined which describes hardware features programmed into the programmable logic unit. When an updated hardware configuration becomes available, it can be downloaded into a centralized file holding configuration information for the main circuit board and add-in options cards of the networked device. The programmable logic unit is re-programmed with the second hardware configuration to provide an updated hardware configuration.

13 Claims, 4 Drawing Sheets

METHOD FOR UPDATING A HARDWARE CONFIGURATION OF A NETWORKED COMMUNICATIONS DEVICE

FIELD OF THE INVENTION

The present invention relates to the field of networked communications devices. More specifically, the present invention provides a method for updating a hardware configuration of a networked communications device.

BACKGROUND OF THE INVENTION

In the current networked environment, routers and switches are used connect a network and direct data to the appropriate destination. As the hardware capabilities of networked devices continue to grow, companies and network providers find themselves in a constant cycle of upgrading their existing equipment or buying new equipment in order to stay competitive. While it is comparatively easy to provide greater capacity for new software features by, for example, providing more storage and memory, it has proven difficult to provide greater capacity for hardware upgrades without buying an entirely new system. This is proving to be an expensive burden which shows no indication of relenting.

FIG. 1 illustrates various components utilized in an exemplary prior art router printed circuit board 100. In FIG. 1, a memory block 101 and a memory expansion socket 102 are coupled to a central processing unit (CPU) 103 by a system bus 104. Input/output (I/O) slots 105 and 115 are for add-in options cards which provide additional functions to router 100 and are coupled to a field programmable gate array (FPGA) 106 by a system bus 107. Digital signal processor (DSP) blocks 108 and 116 are special-purpose circuits used for digital signal processing which are commonly used in math-intensive signal processing applications and are coupled with FPGA 106 by a system bus 109. CPU 103 is further coupled with a complex programmable logic device (CPLD) 110 by a system bus 111. Printed circuit board 100 is further comprised of an Ethernet port 112, and a console port 113 and auxiliary port 114 which are both, for example, RS-232 ports and are coupled to CPU 103 by system busses (not shown). An encryption card (not shown) interfaces with CPU 103 and usually sits above it.

In order to gain a competitive advantage, manufacturers of routers and switches have developed an architecture for their products which will lower their costs as much as possible. Elements of this architecture include using Application Specific Integrated Circuits (ASICs), shared system busses, and integrating as many system components directly on the device's motherboard as possible. In placing system components on the motherboard, the manufacturer can keep costs down by not having to provide interfaces for add-in options cards which are more expensive to the manufacturer. While these steps lower the short term costs to manufacturers and consumers, in the long run they are proving to be more expensive for consumers and manufacturers due to the fact that the system hardware can not be reconfigured.

In using ASICs, the available hardware features for a given device are limited to whatever features the ASIC can provide. The ASICs are normally bonded to the printed circuit board of the device and can not be removed because this is less expensive than providing interfaces on the motherboard for accommodating add-in options cards. This makes it impossible to upgrade the hardware features or the performance of the device and necessitates buying new equipment in order to keep pace with changing technology.

One example of this is the CPU (e.g., CPU 103 of FIG. 1). When a new generation CPU becomes available, it typically has a different physical connection (or pin-out) from the preceding generation. This makes it impossible to simply boost the device's performance by adding a faster CPU because a new motherboard is needed as well to accommodate the new CPU pin-out. Furthermore, while the technology can change every 6 months, it takes up to 9 months for the manufacturer to develop and distribute the new technology to the consumer. This means that the devices frequently get shipped with technology which is already a generation behind and can not be easily updated or reconfigured.

To provide some level of reconfigurability, manufacturers provide a limited number of interfaces for add-in cards. As was previously stated, the number of interfaces is kept to a minimum to keep motherboard fabrication costs down. These interfaces are limited in the hardware features which they provide because they are given only limited access to system resources. For example, these interfaces do not have full access to the data, control, and address busses of the motherboard. This limits the functionality of the add-in cards. Furthermore, there is no provision for changing the hardware configuration of these add-in cards to add hardware features or extends their usable lifetime. The only other interfaces on the motherboards are for adding more memory to the system which does not address the problem of hardware reconfigurability.

Another way of providing reconfigurability is to use Programmable Logic Devices (PLDs) such as Complex Programmable Logic Devices CPLDs (e.g., CPLD 110 of FIG. 1) and Field Programmable Gate Arrays FPGAs (e.g., FPGA 106 of FIG. 1). PLDs are logic chips which can be programmed at the customers site by a software file which configures the PLD to perform a logical function. Typically, PLDs have been limited by the nature of the connection they share with the rest of the system. Frequently, they only have limited access to the data and address busses of a router. In other instances, they are only accessed by the system CPU through the system control bus. This limits the utility of PLDs because the range of functions they are capable of performing is limited by the lack of access to all of the resources of the system printed circuit board.

Another drawback which prevents using PLDs to their full advantage is that the configuration software for the PLD is typically downloaded to a serial Programmable Read Only Memory (PROM) device. While PLDs can be reconfigured numerous times, serial PROMs can only be programmed once which in turn limits the PLD to being configured once. This negates the advantage of having programmable logic devices in the system and prevents using them to their full potential. Furthermore, because the serial PROMs limit the PLDs to only one reconfiguration, additional serial PROMs and PLDs have to be added to the system to reconfigure each additional component in the system such as add-in cards and I/O boards.

Accordingly, a need exists for a secure method for updating the hardware configuration of a networked communications device to extend the usable life of the printed circuit board as well as any add-in options cards coupled to it. It is also desirable that this method provides a centralized approach for updating the system as a whole and can perform the hardware reconfiguration automatically or with minimal user intervention.

SUMMARY OF THE INVENTION

The present invention pertains to a method and apparatus for updating a hardware configuration of a networked communications device. A first hardware configuration is determined which describes hardware features programmed into the programmable logic unit. When an updated hardware configuration becomes available, it can be downloaded into a centralized file holding configuration information for the main circuit board as well as add-in options cards and programmable logic units of the networked device. The programmable logic unit is re-programmed with the second hardware configuration to provide new hardware functions or enhance the performance of existing ones. The centralized memory area can receive numerous hardware descriptions which allows the present invention to effectively extend the usable life span of the networked communications device and facilitates updating hardware reconfiguration.

BRIEF DESCRIPTION OF THE DRAWINGS

The accompanying drawings, which are incorporated in and form a part of this specification, illustrate embodiments of the present invention and, together with the description, serve to explain the principles of the invention.

DESCRIPTION OF THE PREFERRED EMBODIMENT

Reference will now be made in detail to the preferred embodiments of the present invention, examples of which are illustrated in the accompanying drawings. While the present invention will be described in conjunction with the preferred embodiments, it will be understood that they are not intended to limit the present invention to these embodiments. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The present invention provides a method for updating the hardware configuration of a networked communications device, such as a router. While the present embodiment recites a router, the present invention is well suited to be utilized on a variety of networked communications devices and not intended to be limited solely to conventional routers alone. Such devices include but are not limited to switches, hosts, and other such devices on a networked communications system which are not specifically cited.

Figure 1:
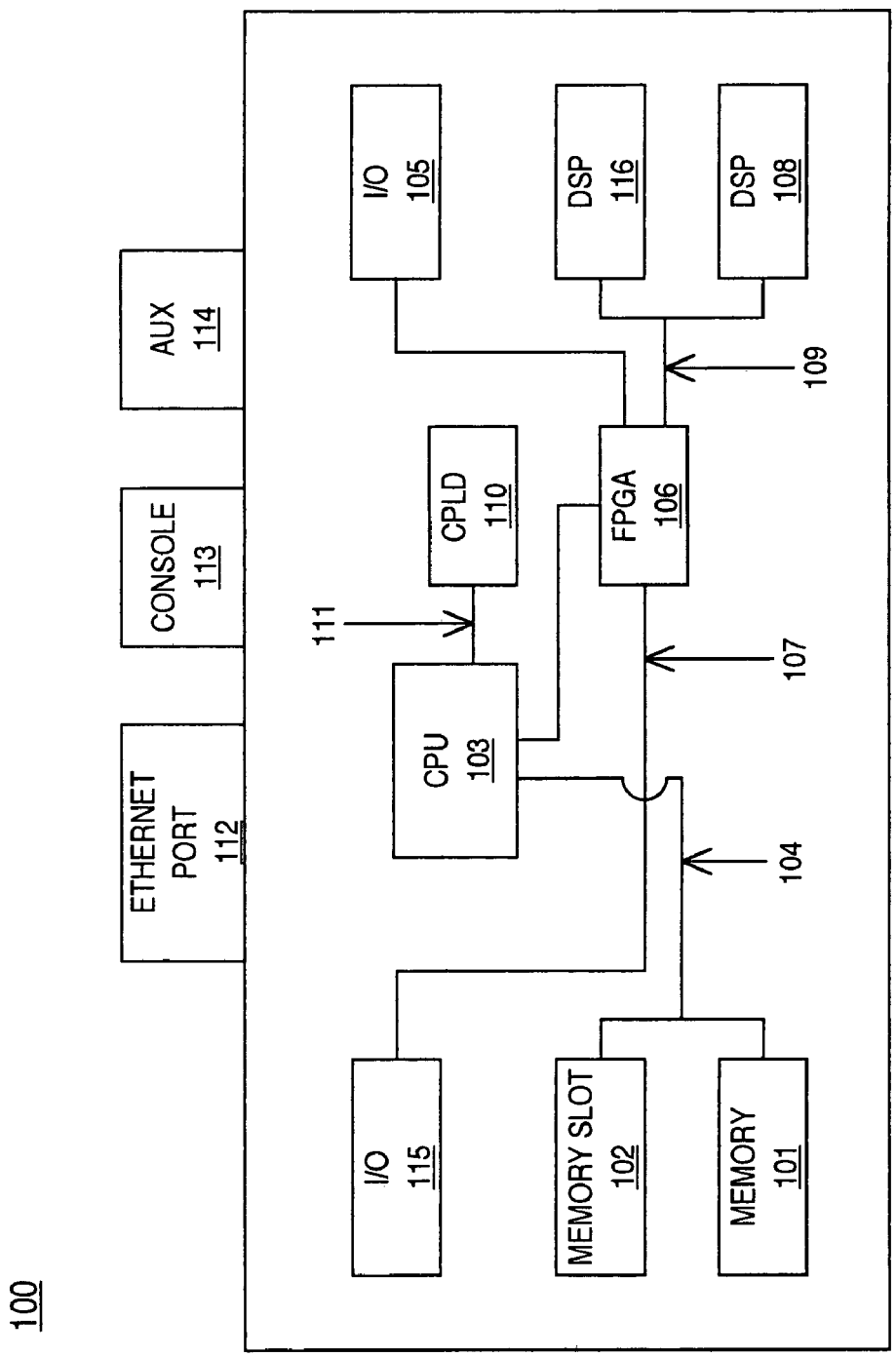
FIG. 1 illustrates various components utilized in an exemplary prior art router printed circuit board.
Figure 2:
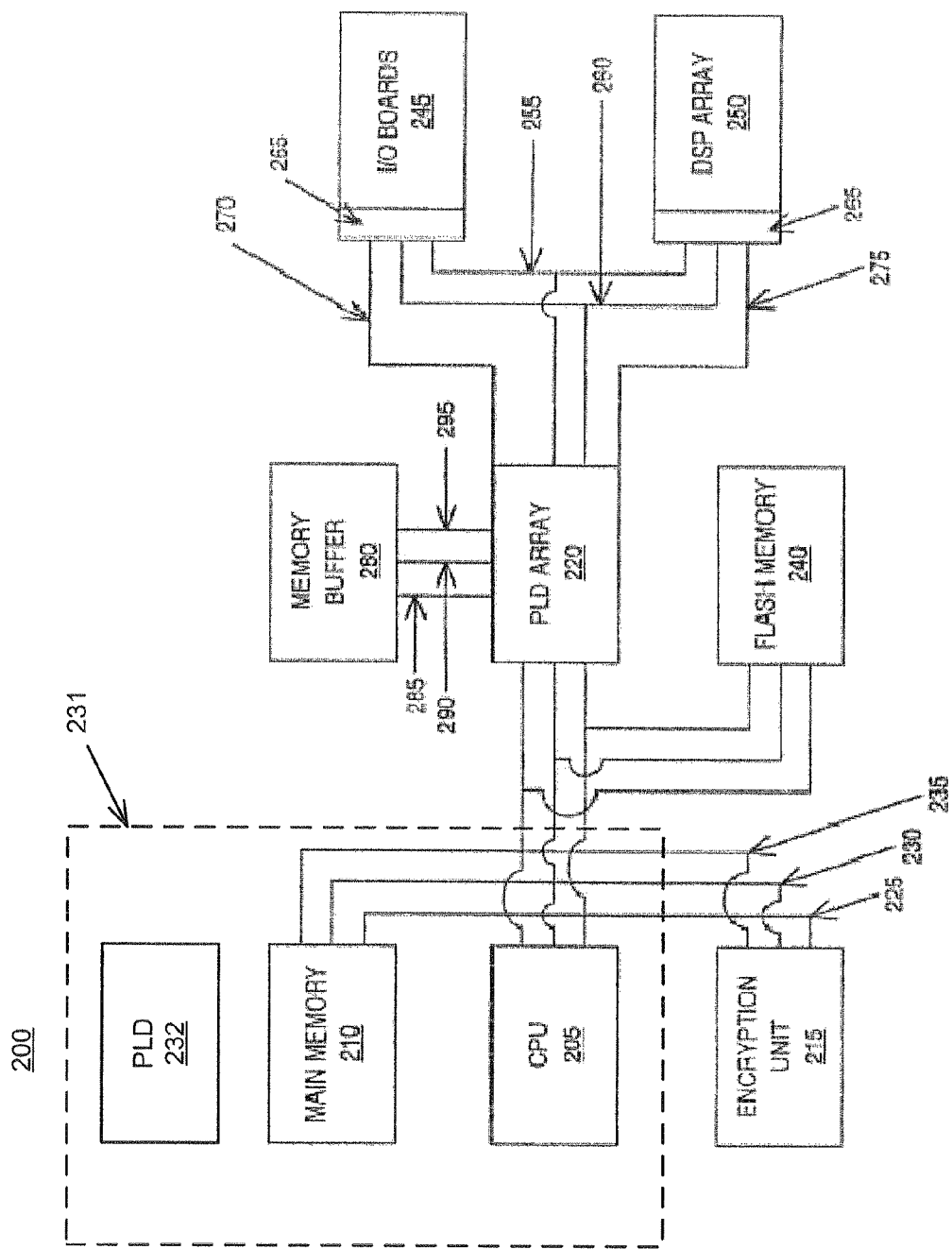
FIG. 2 is a block diagram of an exemplary bus architecture upon which embodiments of the present invention may be practiced.

FIG. 2 is a block diagram of an exemplary bus architecture for a networked communications device 200 in accordance with embodiments of the present invention. A central processing unit (CPU) 205 is coupled with a main memory 210, an encryption unit 215, and to a plurality of programmable logic devices (PLD array 220) by a control bus 225, data bus 230, and an address bus 235. It is appreciated that one or more of the slots with which PLD array 220 interfaces with busses 225, 230, and 235 may not be populated and that device 200 will still function as a router. A Flash memory device 240 is also coupled with control bus 225, data bus 230, and address bus 235.

PLD array 220 is further coupled with input/output (I/O) boards 245 and digital signal processor (DSP) arrays 250 by data bus 255 and address bus 260 through interfaces 265. It is appreciated that address bus 260 may include serial data busses between PLD array 220, I/O boards 245, and DSP arrays 250. In one embodiment, separate serial data busses couple PLD array with I/O boards 245 and with DSP array 250. PLD array 220 is also coupled with I/O boards 245 and with DSP arrays 250 by control busses 270 and 275 respectively. The bus connections between PLD 220 and the rest of the system are full width which means PLD 220 has full access to available system resources. PLD array 220 is also coupled with an optional buffer memory 280 through data bus 285, address bus 290, and control bus 295.

In one embodiment, the present invention provides a socket for a removable card which can hold the CPU (e.g., CPU 205 of FIG. 2) and the main memory (e.g., main memory 210 of FIG. 2) of the system. This removable card 231 may also hold additional PLDs 232 to provide more configuration options if needed. In one embodiment, the main memory on the add-in card is dynamic read only memory (DRAM). While the present invention recites DRAM, it is well suited to utilize a variety of memory technologies. By placing the CPU on a removable card, the present invention provides the ability to upgrade the hardware configuration of networked devices. For example, when a new generation CPU becomes available, the removable card is replaced with one that can physically interface with the new CPU. In the past, this was not possible because the physical interface was attached to the motherboard. If a new CPU had a different pin-out, it could not be used in the router unless the entire motherboard was replaced.

Encryption unit 215 is on the address, data, and control busses of CPU 205. Additionally, in one embodiment extra signals are routed to the connector for the encryption unit so that it can be used as a logic analyzer connector/debug port. The connector for the encryption unit can also be used as an interface to a printed circuit board to provide an additional processor with additional memory. This processor can be used instead of CPU 205 or as a secondary processor to provide multi-processor capability to device 200. This processor would interface with the rest of the system using a bus request grant type of handshaking. In another embodiment, the encryption functions are integrated with the removable card upon which CPU 205 is mounted.

PLDs are integrated circuit chips comprised of programmable interconnections between logic blocks which can be configured with a software program to construct a logic circuit. PLD array 220 is, in one embodiment, a field programmable gate array (FPGA). The configuration information for the FPGA is held in Flash memory (such as Flash memory area 240 of FIG. 2) and is loaded when the system is powered up and the operating system is loaded into memory.

In one embodiment, Flash memory area 240 is comprised of two Flash memory devices. Flash memory is sector programmable meaning that when a change is made to the configuration, only the changed portions are erased and rewritten. The configuration files for the FPGAs are stored in a redundant fashion with one copy on each of the Flash memory devices. This allows either copy of a FPGA configuration file may be updated without affecting the other copy. For example, one Flash memory device can hold a default configuration version while the other contains the most recent configuration version. This ensures that there is always one good copy of the PLD configuration on the router. When changes are made to the configuration files, the new configuration file undergoes a checksum operation to verify that a good copy of the configuration has been received and is then timestamped. The new configuration can be received at the same time a new version of the operating system is downloaded or as an update to an existing hardware configuration. When the boot process initiates, the configuration with the latest timestamp having a correct checksum is read into memory and used to configure the PLD array. If for some reason the PLD configuration can not be retrieved from Flash memory, the present invention can provide the configuration through network connections such as from a server or another router on the network.

The FPGAs can be configured to take on the role of a great variety of ASIC functions such as communications controllers, data compression circuits, protocol converters, and arbiters. This reduces the load on the CPU and improves the overall performance of the device. For example, while CPU 205 is accessing main memory 210, the FPGAs can be moving data from an I/O board (e.g., I/O board 245 of FIG. 2) to memory buffer 280. The FPGAs could then move the data from memory buffer 280 to DSP array 250 or format the data into larger words and send it to main memory 210. This takes traffic off of the CPU bus and prevents using memory bandwidth for buffer memory requirements.

In another example, transceiver and impedance matching circuitry can be provided for a plurality of I/O interfaces on the main printed circuit board while the rest of the functions of I/O boards 245 are integrated into the FPGA. This eliminates redundancy and allows a greater number of I/O interfaces to fit onto the router without devoting excessive router space for the I/O boards.

Figure 3:
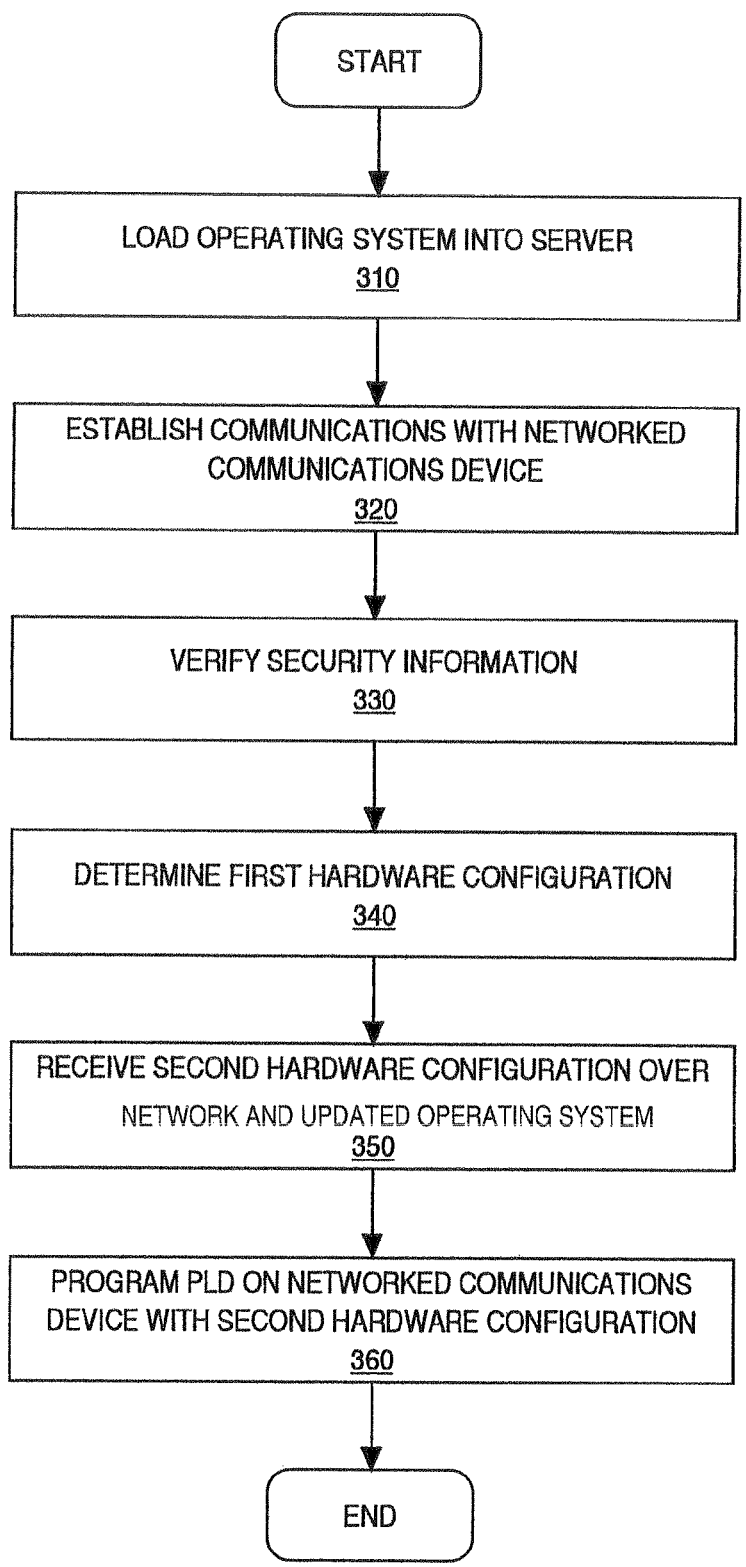
FIG. 3 is a flow chart of a method for updating the hardware configuration of a networked communications device in accordance with embodiments of the present invention.

FIG. 3 is a flow chart 300 of a method for updating hardware configuration on a networked communications device in accordance with embodiments of the present invention. Specifically, flow chart 300 describes a method in which the hardware configuration can be loaded into a networked communications device, such as a router or switch, in conjunction with the downloading of an operating system version. In the following description, the method of flow chart 300 loads a hardware configuration into a centralized configuration file which is held in non-volatile memory (e.g., flash memory 240 of FIG. 2) on the printed circuit board of a networked communications device.

With reference to step 310 of FIG. 3, an operating system version is loaded into a server. While the present embodiment recites loading the operating system into a server, the method of the present embodiment is well suited to loading the operating system into various other devices which are also communicatively coupled to the networked communications device receiving the hardware configuration. A server is recited as it can be used to provide a central location from which the operating system can be loaded into multiple routers or other devices on the network. The operating system has, in the form of data files, configuration information for the programmable logic devices (e.g., PLD array 220 and I/O boards 245 of FIG. 2) of the networked communications device which will create a new hardware configuration.

With reference to step 320 of FIG. 3, communications are established between the server and the networked communications device. In one embodiment, the networked communications device is a router. While the present embodiment recites a router, the present invention is well suited to provide an updated hardware configuration for a variety of networked communications devices. A Telnet session is initiated with the router to provide an administrator remote access to the router. While a Telnet session is recited, the present invention is well suited to a variety of communications applications such as a hyper text transmissions protocol (HTTP) server. Typically, this would be done over the communications network to which the router is coupled. However, the router also provides communications ports which allow the administrator to couple directly with the router or to access the router using, for example, a modem and public telephone network. The administrator logs into the router as the first step in actually managing the resources of a router.

With reference to step 330 of FIG. 3, security information is verified. After logging on the router, the administrator will have to provide a security password to gain access to the router's operating system. The password is stored in configuration files in the non-volatile memory (e.g., flash memory 240 of FIG. 2) of the router being configured. The password can also be encrypted to provide a higher level of security when communicating across a wide area network.

With reference to step 340 of FIG. 3 and to FIG. 2, a first hardware configuration of the router is determined. Configuration information of the hardware resources is collected by the router's processor (e.g., CPU 250 of FIG. 2). Hardware configuration can include, for example, a file or set of files for FPGAs that are either fully or partially reconfigurable, downloadable microcode files for an FPGA or an ASIC, and downloadable firmware for embedded processors, which control switching or packet processing. In one embodiment, the configuration information is collected over the router's serial peripheral bus. While the present embodiment recites a serial peripheral bus, the present invention is well suited to utilizing other interfaces such as a serial JTAG, or parallel interface as well. The configuration of resources on the printed circuit board such as the hardware configuration of PLD array 220, add-in cards (e.g., I/O boards 245 of FIG. 2), and any PLDs on the I/O boards themselves is collected and stored (e.g., in Flash memory 240).

With reference to step 350 of FIG. 3, a second hardware configuration is received by the router. At this point, the operating system version, which includes the second hardware configuration, is downloaded over the network into the non-volatile memory (e.g., flash memory 250 of FIG. 2). The operating system can be, for example, an update which includes new hardware functionality, enhanced hardware features, or hardware performance enhancements necessary for the new operating system version to run optimally.

The configuration file for the FPGAs and CPLDs can be encrypted to provide greater security and prevent the loading of a hacked version of the hardware configuration. Only a server supplying the correct password can download a hardware configuration for the router. The router vendor corporate site can act as a secure third-party authenticator for both the router and the file server and can be used to determine whether the router needs to receive a new hardware configuration.

In one embodiment, two flash memory units are provided for redundancy, one holds a default version of the operating system and hardware configuration while the other receives the most recent version. In another embodiment, one flash memory unit that is sufficiently large to hold two operating system changes and hardware configuration is used. This ensures that there is always one good copy of the PLD configuration on the router so that the router will not be disabled if, for example, there is a power failure during the download of a new operating system version. A checksum operation is performed on the downloaded files to verify that a good copy has been received and the files are then timestamped. When the boot process initiates, the configuration with the latest timestamp having a correct checksum is used to configure the PLDs. If for some reason the PLD configuration can not be retrieved from flash memory, the present invention can obtain the configuration through network connections such as from a file server or another router on the network having the configuration information.

With reference to step 360 of FIG. 3, a programmable logic device of the router is programmed with the second hardware configuration. When the router is restarted, the boot loader will read the latest good configuration file in the Flash memory and use that information to program the CPLDs and FPGAs on both the printed circuit board and the add-in cards (e.g., I/O boards 240 of FIG. 2) to create a new hardware configuration for the router.

In so doing, the present invention provides a secure method for reconfiguring the hardware configuration of a router in conjunction with the downloading of an operating system version. The configuration for the printed circuit board and add-in cards is held in a central, non-volatile memory area and can be reconfigured with multiple hardware configurations. The present invention allows a hardware configuration edition to be associated with and more closely integrated with a software edition. Furthermore, the present invention extends the product life of both the printed circuit board and the add-in cards without having to send them back to the factory to be serviced.

Figure 4:
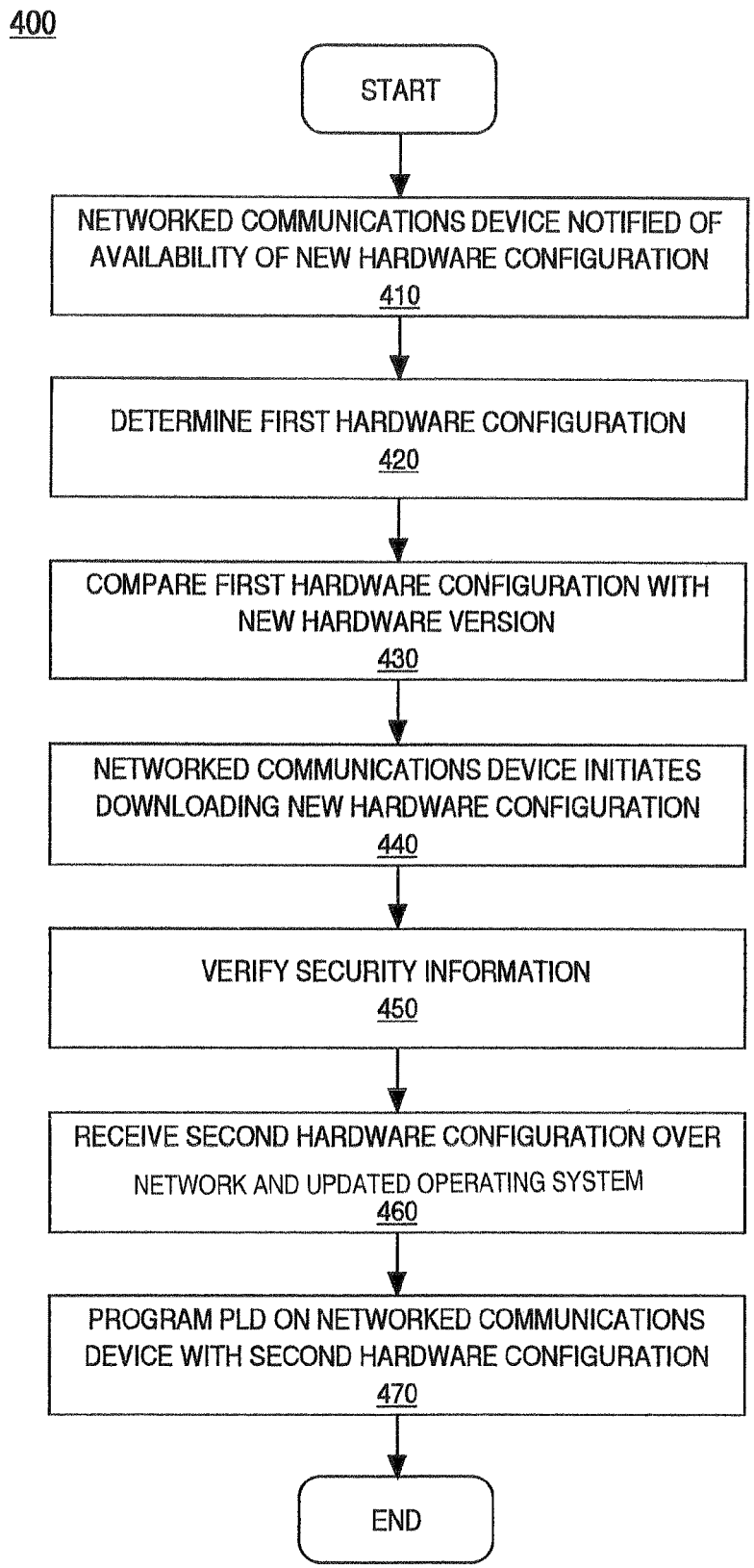
FIG. 4 is a flow chart of a method for updating the hardware configuration of a networked communications device in accordance with embodiments of the present invention.

FIG. 4 is a flow chart 400 of a method for updating hardware configuration on a networked communications device in accordance with embodiments of the present invention. In flow chart 400 the networked communications device receives a new hardware configuration in response to a notification of the availability of a new hardware configuration.

With reference to step 410 of FIG. 4, the networked communications device is notified of the availability of a new hardware configuration. In one embodiment, networked communications device 400 is a router. While the present embodiment recites a router, the present invention is well suited to be utilized on a variety of networked communications devices to update their hardware configurations. The notification of step 410 may originate, for example, from the corporate site of the router vendor to notify customers of available updates, enhanced features, or hardware performance enhancement updates as they become available.

The notification may also come from another router on the same network. When the amount of communications traffic is low, routers frequently exchange information such as routing paths and other metrics needed to route communications more efficiently. One router can simply broadcast to the other routers on the network that it has an updated hardware version for a particular hardware level.

Alternatively, a timer on the router or a local server can be configured to poll a third party server in a secured fashion to determine if hardware configuration updates are available.

With reference to step 420 of FIG. 4, a first hardware configuration is determined. Again, configuration information of the hardware resources is collected by the router's processor (e.g., CPU 205 of FIG. 2) over the system's serial peripheral interface bus, serial JTAG, or parallel bus. The configuration of resources on the printed circuit board, the add-in cards (e.g., I/O boards 240 of FIG. 2), and the configuration images of the FPGAs and CPLDs is collected create this first hardware configuration. Hardware configuration can include, for example, a file or set of files for FPGAs that are either fully or partially reconfigurable, downloadable microcode files for an FPGA or an ASIC, and downloadable firmware for embedded processors, which control switching or packet processing.

With reference to step 430 of FIG. 4, the first hardware configuration is compared with the new hardware version to determine whether a hardware update is necessary. The hardware configuration on the router is given a version number to identify the configuration. This is compared with the available hardware version to determine whether a the new version should be downloaded. In one embodiment, a system administrator is notified of the availability of the new hardware configuration to give the administrator the option of not changing the hardware configuration.

With reference to step 440 of FIG. 4, the router initiates downloading of the new hardware configuration. Again, the initiating can be in response an administrator command or scheduled to occur when network use is low to avoid downtime for the router or to coincide with software updates. The router acknowledges the source sending the hardware update and initiates the downloading of the configuration information.

With reference to step 450 of FIG. 4, security information is verified. The corporate site of the router vendor can, using secure encryption protocols, act as a secure third-party authenticator for both the router and the file server or router holding the updated hardware configuration. For example, the file server providing a new hardware configuration and the router being updated can be verified at the corporate site using identification numbers supplied at the factory before they are shipped which are stored in non-volatile memory.

With reference to step 460 of FIG. 4, a second hardware configuration is received over the network. As in flow chart 300, the configuration is downloaded into the router's flash memory, a checksum is performed on the downloaded data, and the new configuration is timestamped.

With reference to step 470 of FIG. 4, a programmable logic device is programmed with the second hardware configuration. When the router is re-booted, the second hardware configuration is read from the flash memory and the CPLDs and FPGAs are programmed to create the new configuration. This can be scheduled to occur immediately or when network use is low.

Embodiments of the present invention provide a secure method for updating the hardware configuration of a networked communications device to extend the usable life of the printed circuit board as well as add-in options cards coupled to it. Furthermore, the present invention provides a centralized approach which updates the system as a whole, as opposed to updating components individually, and can be scheduled to be performed when network traffic is minimal.

The preferred embodiment of the present invention, a method for updating a hardware configuration of a networked communications device, is thus described. While the present invention has been described in particular embodiments, it should be appreciated that the present invention should not be construed as limited by such embodiments, but rather construed according to the following claims.

What is claimed is:

1. A system, comprising:
a server for storing operating system and hardware configuration updates for routing devices; and
a routing domain containing a plurality of routers each containing an internal routing table for identifying routes through a packet switched network, each router operating a routing protocol configured to synchronize that router's internal routing table with the other tables in the routing domain by sending messages according to the protocol, wherein the messages propagate information about new or changed routes within the routing domain;
wherein the routing protocol is further configured to time internal routing table synchronization according to continuous measurements of communication traffic such that the internal routing table synchronization occurs when the measured communication traffic drops below a threshold level;
wherein at least one of the routers in the routing domain is encoded with instructions that, if executed, result in:
storing a default router operating system version and a default router hardware configuration in a first flash memory unit on said at least one router, said default router hardware configuration having an associated checksum and an associated timestamp indicating when said default router hardware configuration was downloaded;
downloading an updated router operating system version and an updated router hardware configuration from the server, wherein said instructions are further configured to monitor for occurrence of the routing table synchronizations and opportunistically initiate said downloading in response to observing one of the routing table synchronizations so that said download initiation coincides with timing determinations of the routing protocol, and wherein said updated router hardware configuration and said updated router operating system version are stored in a second flash memory unit of said at least one router by erasing and rewriting said second flash memory unit;
performing a checksum operation on said updated router hardware configuration to verify a received copy of said updated router hardware configuration;
creating a timestamp associated with said updated router hardware configuration to indicate when said updated router hardware configuration was downloaded;
programming a plurality of programmable logic units on said at least one router according to said updated router hardware configuration, wherein said programming occurs if said updated router hardware configuration has a correct checksum and a more recent associated timestamp than said default router hardware configuration, wherein said programmable logic units are coupled with said at least one router via a removable card, and wherein said removable card is removably attached to said at least one router;
disposing a CPU and a main memory of the at least one router on the removable card, such that the CPU and the main memory of the at least one router are coupled with the at least one router via the removable card; and
broadcasting notification of the updated router operating system version and the updated router hardware configuration across the routing domain, wherein said broadcast notification triggers the routing domain to autonomously synchronize to the new configuration;
wherein the other routers receiving the broadcast notification are configured to delay downloading their configurations from the server, if necessary, so that said downloading by the other routers coincides with the routing protocol's timing determinations.

2. A method, comprising:
storing a default operating system version and a default hardware configuration of a networked communications device in a first flash memory unit on said networked communications device, said default hardware configuration having an associated checksum and an associated timestamp indicating when said default hardware configuration was received;
receiving an updated operating system version and an updated hardware configuration for said networked communications device over a network, wherein said updated hardware configuration and said updated operating system version are received into a second flash memory unit of said networked communications device by erasing and rewriting said second flash memory unit;
performing a checksum operation on said updated hardware configuration to verify a received copy of said updated hardware configuration;
creating a timestamp associated with said updated hardware configuration to indicate when said updated hardware configuration was received;
programming a plurality of programmable logic units on said networked communications device according to said updated hardware configuration wherein said programming occurs if said updated hardware configuration has a correct checksum and a more recent associated timestamp than said default hardware configuration, wherein said programmable logic units are coupled with said network communications device via a removable card, and wherein said removable card is removably attached to said network communications device;
disposing a CPU and a main memory of the networked communications device on the removable card, such that the CPU and the main memory of the networked communications device are coupled with the networked communications device via the removable card;
collecting information, wherein a component of said networked communications device sends a configuration description to a processor of said networked communications device;
creating said default hardware configuration, wherein said processor creates said default hardware configuration using said configuration description; and
comparing said default hardware configuration with said updated hardware configuration and initiating download of said updated hardware configuration upon request of said networked communications device based on low network usage.

3. The method as recited in claim 2, wherein said method further comprises verifying security information.

4. The method as recited in claim 2, wherein said method further comprises configuring said networked communications device with a schedule for initiating said receiving of said updated hardware configuration.

5. A router, comprising:
a bus;
a processor coupled to said bus;
a memory unit coupled to said bus, the memory unit storing instructions that, if executed by the processor, result in:

storing a default router operating system version and a default router hardware configuration in a flash memory unit on said router, said default router hardware configuration having an associated checksum and an associated timestamp indicating when said default router hardware configuration was downloaded;

downloading an updated routing operating system version and an updated routing hardware configuration for said router over a network, wherein said instructions are further configured to monitor for occurrence of a routing table synchronization controlled by a routing protocol operating on the router and opportunistically initiate said downloading in response to observing the occurrence of the routing table synchronization, and wherein said updated routing hardware configuration and said updated router operating system version are stored in said flash memory unit of said router, said flash memory unit being erasable and rewritable;

performing a checksum operation on said updated router hardware configuration to verify a received copy of said updated router hardware configuration;

creating a timestamp associated with said updated router hardware configuration to indicate when said updated router hardware configuration was downloaded;

programming a plurality of programmable logic units on said router according to said updated router hardware configuration, wherein said programming occurs if said updated router hardware configuration has a correct checksum and a more recent associated timestamp than said default router hardware configuration; and notifying other routers of the updated router operating system version and the updated router hardware configuration, wherein the instructions are further configured to opportunistically time sending of the router-to-router notification to coincide with the occurrence of the routing table synchronization or the occurrence of a subsequent routing table synchronization.

6. The router as recited in claim 5, wherein said opportunistic download initiation corresponds to a time that the routing protocol identifies as being associated with measured network usage dropping below a preset threshold.

7. The router as recited in claim 5, wherein said instructions further result in verifying security information.

8. The router as recited in claim 5, wherein the instructions further result in comparing said default router hardware configuration with said updated router hardware configuration.

9. A machine readable medium storing instructions that, if executed, result in:

storing a default router operating system version and a default router hardware configuration in a flash memory unit on a router, said default router hardware configuration having an associated checksum and an associated timestamp indicating when said default router hardware configuration was downloaded;

downloading an updated router operating system version and an updated router hardware configuration for said router over a network, wherein said instructions are further configured to monitor for communication of a routing table synchronization message using a routing protocol operating on the router and opportunistically initiate said downloading in response to observing the communication of the routing table synchronization message, and wherein said updated router hardware configuration and said updated router operating system version are stored in said flash memory unit of said router;

performing a checksum operation on said updated router hardware configuration to verify a received copy of said updated router hardware configuration;

creating a timestamp associated with said updated router hardware configuration to indicate when said updated router hardware configuration was downloaded; and programming a plurality of programmable logic units on said router according to said updated router hardware configuration wherein said programming occurs if said updated router hardware configuration has a correct checksum and a more recent associated timestamp than said default router hardware configuration, wherein said programmable logic units are coupled with said router via a removable card, and wherein said removable card is removably attached to said router.

10. The machine readable medium as recited in claim 9, wherein said opportunistic download initiation corresponds to a time that the routing protocol identifies as being associated with measured network usage dropping below a preset threshold.

11. The machine readable medium as recited in claim 9, wherein the instructions further result in verifying security information.

12. The machine readable medium as recited in claim 9, wherein the instructions further result in notifying another router of the updates to cause the other router to opportunistically initiate downloading of the updates by monitoring for the routing table synchronization messages.

13. The machine readable medium as recited in claim 9, wherein the instructions further result in comparing said default router hardware configuration with said updated router hardware configuration.

* * * * *

UNITED STATES PATENT AND TRADEMARK OFFICE
CERTIFICATE OF CORRECTION

PATENT NO. : 7,577,726 B1
APPLICATION NO. : 10/071811
DATED : August 18, 2009
INVENTOR(S) : Conard et al.

Page 1 of 1

It is certified that error appears in the above-identified patent and that said Letters Patent is hereby corrected as shown below:

On the Title Page at Abstract Item (57) beginning at line 1, please replace "In a method for updating a hardware configuration of a networked communications device, a networked communications device is provided with one or more programmable logic units." with --A method for updating a hardware configuration of a networked communications device. In one embodiment of the present invention, a networked communications device is provided with one or more programmable logic units.--.

Signed and Sealed this

Twenty-seventh Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,577,726 B1 Page 1 of 1
APPLICATION NO. : 10/071811
DATED : August 18, 2009
INVENTOR(S) : Conard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 901 days.

Signed and Sealed this

Seventh Day of September, 2010

David J. Kappos
*Director of the United States Patent and Trademark Office*